United States Patent
Roth

(10) Patent No.: US 10,718,112 B1
(45) Date of Patent: Jul. 21, 2020

(54) METHOD OF ATTACHING A HANGER TO A DECK

(71) Applicant: Steven A. Roth, Alamo, CA (US)

(72) Inventor: Steven A. Roth, Alamo, CA (US)

( * ) Notice: Subject to any disclaimer, the term of this patent is extended or adjusted under 35 U.S.C. 154(b) by 0 days.

(21) Appl. No.: 15/847,743

(22) Filed: Dec. 19, 2017

Related U.S. Application Data

(62) Division of application No. 15/018,054, filed on Feb. 8, 2016, now Pat. No. 9,850,659.

(60) Provisional application No. 62/178,080, filed on Mar. 31, 2015.

(51) Int. Cl.
*E04B 1/00* (2006.01)
*E04B 9/00* (2006.01)
*F16B 2/06* (2006.01)
*F16B 2/04* (2006.01)

(52) U.S. Cl.
CPC ............... *E04B 9/00* (2013.01); *F16B 2/04* (2013.01); *F16B 2/065* (2013.01)

(58) Field of Classification Search
CPC ............... E04B 9/00; F16B 2/04; F16B 2/065
USPC ............................................. 52/741.1
See application file for complete search history.

(56) References Cited

U.S. PATENT DOCUMENTS

| | | | | |
|---|---|---|---|---|
| 1,679,881 A * | 8/1928 | Simpson | ............... | A47H 1/022 160/330 |
| 2,293,168 A * | 8/1942 | Pirone | ............... | A47H 1/022 211/105.4 |
| 2,713,983 A * | 7/1955 | Kay | ............... | H02G 3/125 248/200.1 |
| 3,372,523 A * | 3/1968 | Hall, Jr. | ............... | E04B 1/4157 52/336 |
| 3,514,917 A * | 6/1970 | Merrill, Sr. | ............... | E04B 1/4121 52/704 |
| 3,769,774 A * | 11/1973 | Barnes | ............... | E04B 1/4157 248/58 |
| 4,085,558 A * | 4/1978 | Albrecht | ............... | E04B 5/40 29/460 |
| 4,405,111 A * | 9/1983 | Lennon | ............... | E04C 3/02 211/105.4 |
| 4,659,051 A * | 4/1987 | Propp | ............... | E04B 9/006 248/200.1 |
| 4,682,452 A * | 7/1987 | Propp | ............... | E04B 9/006 220/3.9 |
| 4,909,405 A * | 3/1990 | Kerr, Jr. | ............... | H02G 3/125 220/3.2 |
| 5,024,412 A * | 6/1991 | Hung | ............... | H02G 3/20 220/3.9 |
| 5,428,936 A * | 7/1995 | Roth | ............... | E04B 1/4157 248/327 |
| 5,720,461 A * | 2/1998 | Kerr, Jr. | ............... | E04B 9/006 248/217.3 |
| 6,595,479 B2 * | 7/2003 | Johnson | ............... | H02G 3/125 174/58 |

(Continued)

*Primary Examiner* — Basil S Katcheves
(74) *Attorney, Agent, or Firm* — Steven R. Vosen

(57) ABSTRACT

A hanger and method of attaching a hanger to a deck is described. The method includes attaching the hanger parallel to the ground by attaching them to opposing surfaces of a corrugation of the deck. Certain methods include expanding the length of the hanger to place it in compression. Other methods include flexing the hanger to place it in compression. The method is particularly useful in retrofitting as it generates very little noise and vibration in a structure.

6 Claims, 8 Drawing Sheets

(56) References Cited

U.S. PATENT DOCUMENTS

| | | | | |
|---|---|---|---|---|
| 7,011,578 B1* | 3/2006 | Core | ............... | F24F 7/007 |
| | | | | 454/292 |
| 7,093,400 B1* | 8/2006 | Thompson | ............... | E04B 9/18 |
| | | | | 52/698 |
| 9,091,372 B2* | 7/2015 | Lacour | ............... | F16L 3/133 |
| 2009/0272067 A1* | 11/2009 | Gilham | ............... | E04B 1/4157 |
| | | | | 52/707 |
| 2011/0174951 A1* | 7/2011 | Sander, Jr. | ............... | E04B 9/18 |
| | | | | 248/339 |

* cited by examiner

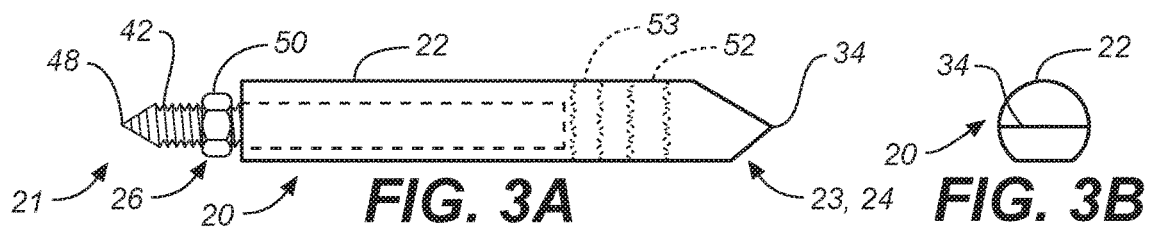
FIG. 3A   FIG. 3B
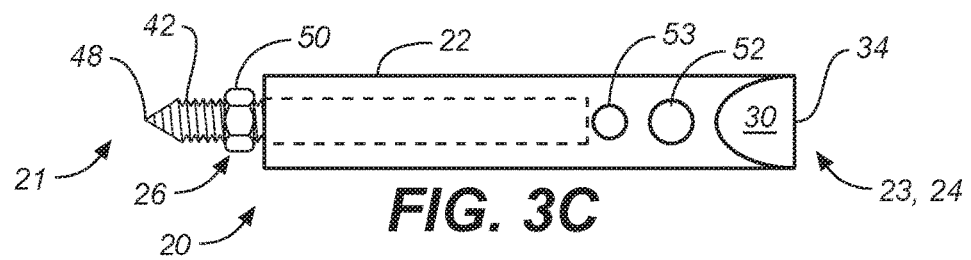
FIG. 3C
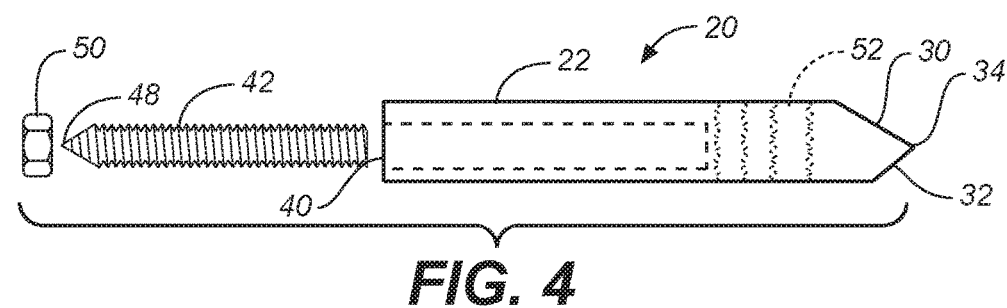
FIG. 4
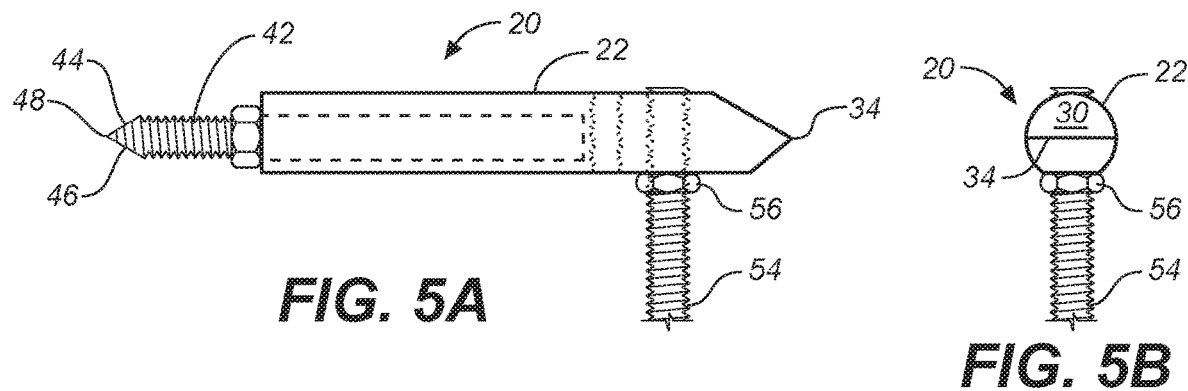
FIG. 5A   FIG. 5B

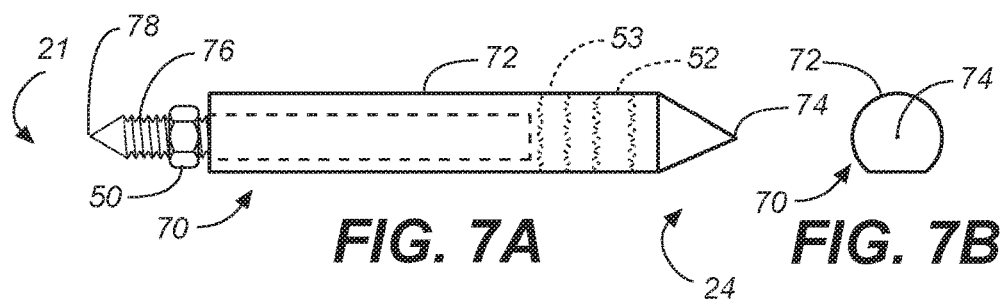
FIG. 7A  FIG. 7B
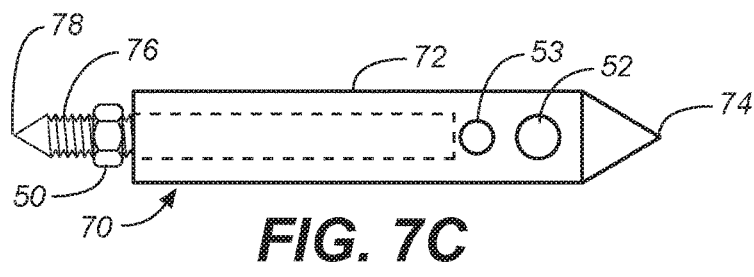
FIG. 7C
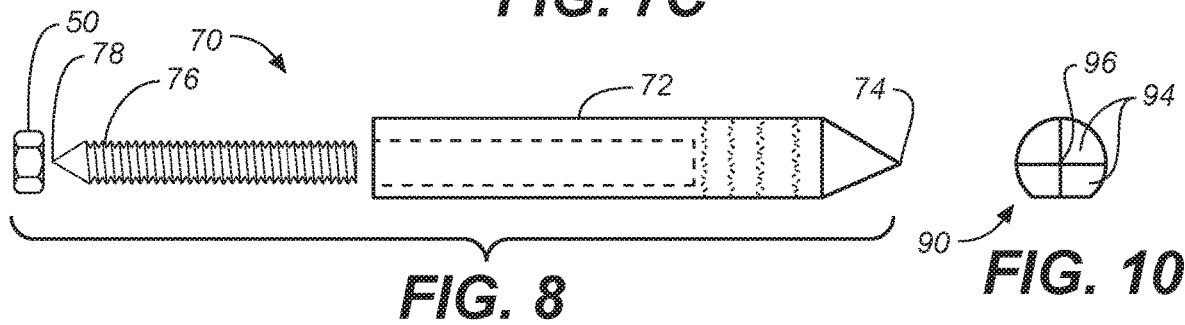
FIG. 8  FIG. 10
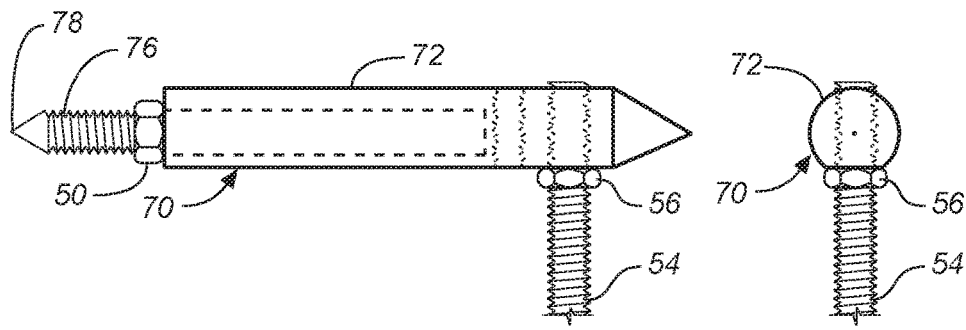
FIG. 9A  FIG. 9B

METHOD OF ATTACHING A HANGER TO A DECK

CROSS-REFERENCE TO RELATED APPLICATIONS

This application claims the benefit of U.S. Provisional Application No. 62/178,080, filed Mar. 31, 2015, the contents of which are hereby incorporated by reference in its entirety.

BACKGROUND OF THE INVENTION

Field of the Invention

The present invention relates to a method for building construction industry, and more particularly to a method for hanging conduits and the like from the underside of an overhead metal deck.

Discussion of the Background

It is standard practice in the construction of commercial buildings to use corrugated metal decking as the floor of each story of a building. It is also common practice to suspend items below the decking for the purpose of connecting to suspended utility loads, such as service elements, including conduits, pipes, ducting, systems and the like (referred to herein collectively as a "conduit").

FIG. 1A is a top view of a prior art metal decking 10 and FIG. 1B is a sectional view 1B-1B of FIG. 1A, illustrating a prior art hanger 1 attached to the underside of the prior art metal decking. Example of metal decking 10 include, but are not limited to, VERCO (VERCO DECKING, INC., Phoenix, Ariz.) models PLW2, W2 FORMLOK™, PLW3, or W3 FORMLOK™.

Metal decking 10 is typically formed from one or more metal sheets of 16-22 gauge formed into a corrugated structure and which may include a concrete on one side of the metal. Thus, for example, FIG. 1A shows metal decking 10 as having a width W and a length L, and including a number of features that extend the length of the decking. Specifically, metal decking 10 is shown as having a plurality of generally horizontal upper flutes 13 with width WU, a plurality of generally horizontal lower flutes 15 a distance D from the upper flutes and having a width WL, and ribs 16 and 17 that connect adjacent lower flutes. Metal decking 10 is shown, in FIG. 1B, as including concrete 12 which is poured over the top of the metal decking.

The internal portions of decking 10 may be considered to include a plurality troughs 14 having a width that varies from width WU at an upper end to width WT at a lower end, which is formed by a pair of adjacent and opposing and mutually facing ribs 16 and 17 and the upper flute 13 that is in between the pair of ribs.

Flutes 13 and 15 and ribs 16 and 17 are generally planar, with the flutes horizontal and the ribs being either sloped, as shown in FIG. 1B or vertical. In certain embodiments, flutes 13 and 15 and ribs 16 and 17 may include indentations, vent holes, undulations, corrugations, or grooves. FIG. 1B shows, for example, that a rib 16 includes groove 18 and that a rib 17 include groove 19, where the grooves extend along the length L of metal decking 10.

It is a typical commercial building construction practice to attach hangers to the underside of overhead metal decking filled with hardened concrete by drilling a hole through the metal decking and hardened concrete, and installing a concrete anchor into the hole in the concrete. FIG. 1B shows a prior art hanger 1, which includes a concrete anchor 3 supported by concrete 12, and a metal hanger 2 attached to the concrete anchor 3.

While prior art hangers, such a hanger 1, are widely used, there are several problems associated with such hangers. First, attaching the hangers involves drilling through two types of material—metal and concrete. This type of operation is noisy and can cause vibrations of the deck structure. While this may not be an issue for new construction, it can be problematic for retrofitting structures, where tenants may be occupying the building.

In addition, drilling or otherwise opening a hole in concrete fractures the concrete and reduces the strength of the concrete for some distance in the concrete. Thus one may have to space the anchors sufficiently far apart to provide sufficient structural support for the anchors.

There is a need in the art for a hanger device and method that is easier to attach to a metal decking. Such a device and method should be able to support sufficient weight to permit the hanging of conduits, should be easy to attach to the underside of metal decking, should involve reduced noise and vibration over prior art techniques, and should allow a user to space the hangers closely. Such a device and method should also be usable for metal decking that does not include concrete reinforcement.

BRIEF SUMMARY OF THE INVENTION

The present invention overcomes the disadvantages of prior art metal deck hangers and methods of hanging conduits from metal decking. In one embodiment, a hanger is placed horizontally across the trough of a corrugated metal deck.

It is one aspect to provide a method of attaching a horizontal device "hanger" to the generally vertical ribs of the underside of a metal decking, where the placement of the metal decking material is generally parallel to the ground and includes a first surface with a first location and a second surface with a second location, where the first surface opposes the second surface, where the first surface and the second surface are not parallel to the ground, and where the hanger includes body between a first end and a second end. The method includes: contacting the first end of the hanger and the first location of the metal decking; and contacting the second end of the hanger and the second location of the metal decking, such that the body of the hanger is generally parallel to the ground.

It is one aspect to provide a method of attaching a hanger to the underside of a metal decking, where the hanger includes a body with first end and a second end, where the metal decking has a depth extending between upper flutes and lower flutes, and ribs each connecting one upper flute to one lower flute, and where the metal decking includes at least one downwards facing trough including a first upper flute, and a first rib and a second rib each attached to the first upper flute, where said first rib is facing said second rib. The method includes contacting the first end of the hanger with the first rib of the metal decking, contacting the second end of the hanger with the second rib of the metal decking, and adjusting the hanger such that the body between the first end and the second end is held in place between the first rib and the second rib.

It is another aspect to provide a method of attaching a hanger to the underside of a metal decking, where the hanger includes a body with first end and a second end, where the metal decking has a depth extending between upper flutes and lower flutes, and ribs each connecting one upper flute to one lower flute, and where the metal decking includes at least one downwards facing trough including a first upper flute, and a first rib having a first groove generally parallel to the length of the metal decking and a second rib having a second groove generally parallel to the length of the metal decking, where the first rib and second rib are each attached to the first upper flute, and where said first groove is facing said second groove. The method includes contacting the first end of the hanger with the first groove of the first rib of the metal decking, contacting the second end of the hanger with the second groove of the second rib of the metal decking, and adjusting the hanger such that the body between the first end and the second end is held in place between the first groove and the second groove.

These features together with the various ancillary provisions and features which will become apparent to those skilled in the art from the following detailed description, are attained by the hanger and methods of attaching a hanger to a metal decking of the present invention, embodiments thereof being shown with reference to the accompanying drawings, by way of example only, wherein:

BRIEF DESCRIPTION OF THE FIGURES

FIGS. 3A, 3B, and 3C are several views of the wedge of FIG. 2, where FIG. 3A is a side elevational view, FIG. 3B is an end elevational view, and FIG. 3C is a top plan view;

FIG. 4 is an exploded side elevational view of the wedge of FIG. 2;

FIGS. 5A and 5B are views of the wedge of FIG. 2 with an attachment, where FIG. 5A is a side elevational view and FIG. 5B is an end elevational view;

FIGS. 7A, 7B, and 7C are several views of the second embodiment of the wedge of FIG. 6, where FIG. 7A is a side elevational view, FIG. 7B is an end elevational view, and FIG. 7C is a top plan view;

FIG. 8 is an exploded side elevational view of the wedge of FIG. 6;

FIGS. 9A and 9B are views of the wedge of FIG. 6 with an attachment, where FIG. 9A is a side elevational view, and FIG. 9B is an end elevational view;

FIG. 10 is an end elevational view of another alternate embodiment of the wedge;

FIG. 11A is a side elevational view, FIG. 11B is a top plan view, and FIG. 11C is an end elevational view;

FIG. 14A is a side elevational view and FIG. 14B is a top plan view;

FIG. 15A is a side elevational view, and FIG. 15B is a top plan view; FIG. 16A is a side elevational view and FIG. 16B is a top plan view.

DETAILED DESCRIPTION OF THE INVENTION

The present invention provided consists of a hanger (also referred to herein as a "wedge") that includes a pair of ends that are held, under compression, between the ribs on the underside of a metal decking. In certain embodiments, the wedge ends may interact with standard deformities or contours in the metal decking and be supported by the metal decking. A wedge so placed can be used as a connection point for various supports, including but not limited to vertical threaded support rods, support cables, wire, etc.

Figure 1A:
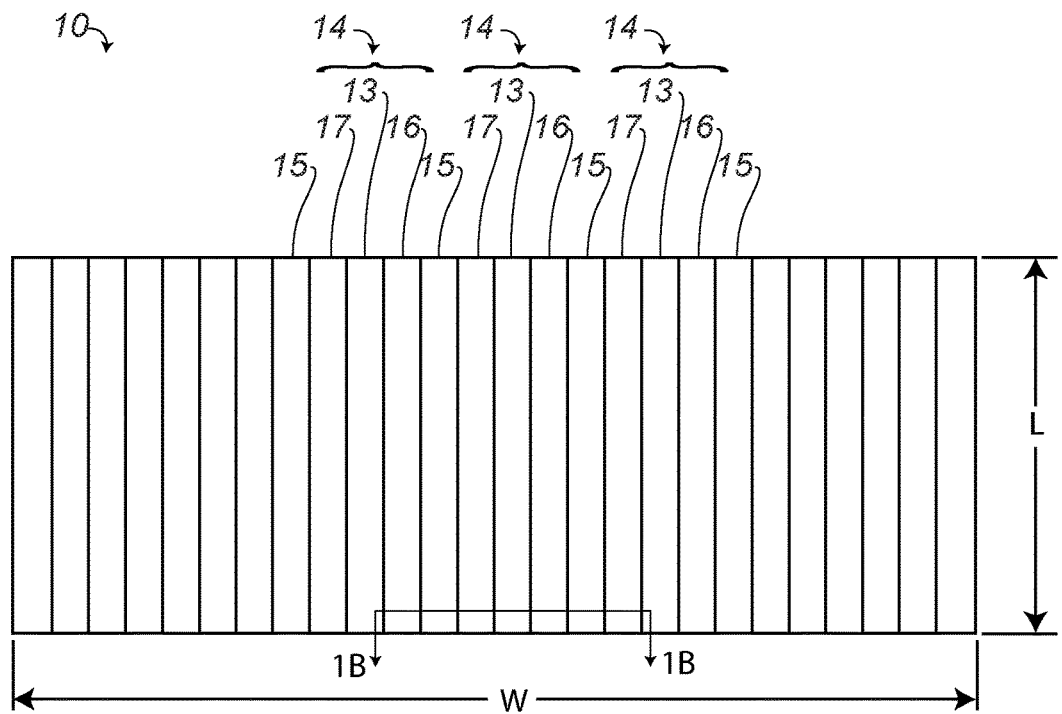
FIG. 1A is a top view of a prior art metal decking.
Figure 1B:
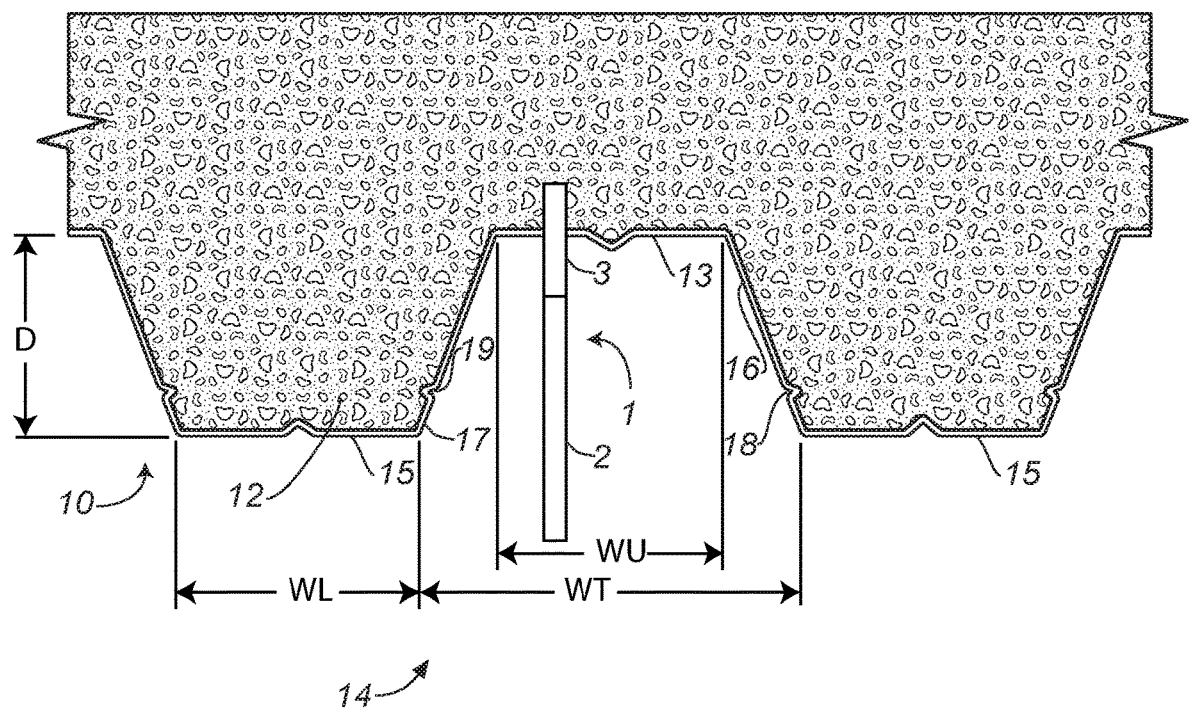
FIG. 1B is a sectional view 1B-1B of FIG. 1A, illustrating a prior art hanger attached to the underside of the prior art metal decking.
Figure 2:
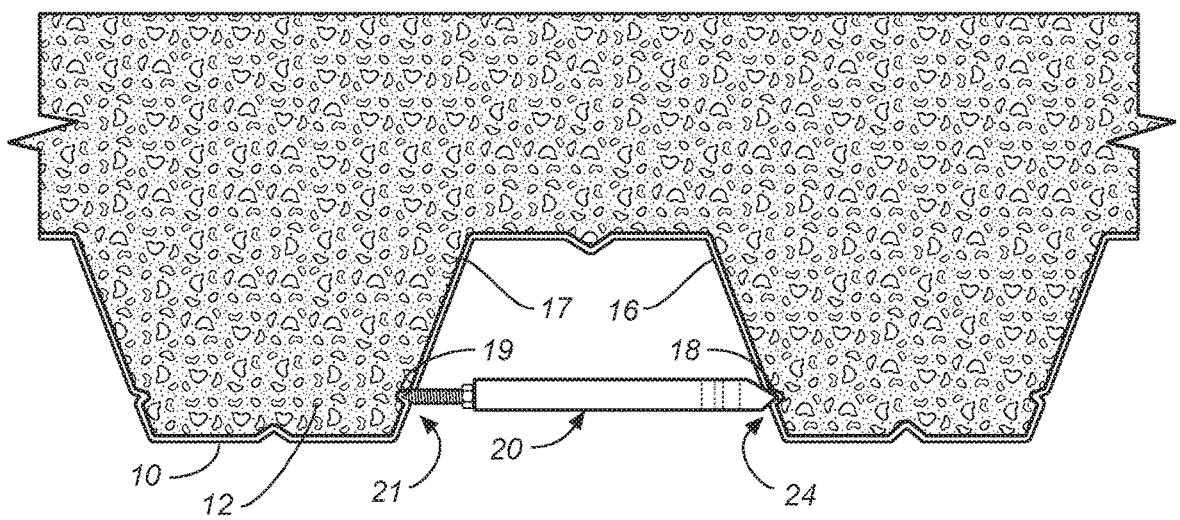
FIG. 2 is an elevational cross-sectional view of a first embodiment of a wedge as installed on a concrete-filled metal decking.

FIG. 2 is an elevational cross-sectional view of a concrete-filled metal decking 10 (similar to a sectional view 1B-1B) including an installed first embodiment of a wedge 20. In general, the wedges described, including but not limited to wedge 20, may be installed horizontally, on the underside of metal decking, and within trough 14. Thus, for example, metal decking typically has a trough width of from 4 inches to 8 inches, and wedge 20 is sized to fit within, or fully within, the trough and while contacting opposing surfaces, such as adjacent ribs 16 and 17. In various embodiments, the inventive wedges, including but not limited to wedge 20 contacts adjacent ribs that at a distance of 4 inches, 5 inches, 6 inches, 7 inches, or 8 inches, and, in certain embodiments, is sized to be contact adjacent ribs with a distance of from 4 inches to 8 inches, from 5 inches to 8 inches, from 6 inches to 8 inches, or from 7 inches to 8 inches. In certain embodiments, the width WU is less that the width WT, as shown in FIG. 1A. In certain other embodiments, the width WU is approximately equal to width WT.

In certain embodiments, wedge 20 includes an elongated body having a first end 21 and a second end 24. As shown in FIG. 2, wedge 20 can be is installed against ribs 16 and 17 of trough 14 and may, for example, be placed within grooves 18, 19. Thus ends 21 and 24 form an axis of wedge 20 that is generally parallel to the metal deck.

In certain embodiments, wedge 20, as installed in metal decking 10 and shown in FIG. 2, is in compression from forces exerted by ribs 16 and 17. Thus, for example, FIG. 2 illustrates first embodiment wedge 20 has having first end 21 inserted into groove 19 and a second end 24 inserted into groove 18. In certain other embodiments, as in FIG. 6, ends 21 and/or 24 may pierce ribs 16 and/or 17, and wedge 20 hangs from the sides, and in not in compression exerted by the sides.

As described subsequently, first embodiment wedge 20 has an adjustable length—that is, a user may increase or decrease the distance between ends 21 and 24. Thus, for example, wedge 20 may be placed with ends 21 and 24 near grooves 19 and 18, respectively, and the distance between the ends is increased, thus securing the wedge between ribs 16 and 17. In certain embodiments, the distance between ends 21 and 24 may be increased to an extent that wedge 20 is in compression and held snugly in place against metal decking 10. In certain other embodiments, the increase in length of wedge 20 causes ribs 16 and 17 to slightly deform, thus providing added support for wedge 20. In either case, wedge 20 can be held securely enough by deck 10 and within trough 14. With wedge 20 thus secured, attachments or loads may be supported by the wedge.

FIGS. 3A, 3B, 3C, and 4 show details of first embodiment wedge 20, where FIG. 3A is a side elevational view, FIG. 3B is an end elevational view, FIG. 3C is a top plan view, and FIG. 4 is an exploded side elevational view of the wedge.

Wedge 20 includes a main barrel 22 with a distal end 23 (which forms second 24 of the wedge), and a barrel proximal end 26 that accepts a threaded rod 42, which extends to a proximal end 21. Distal end 23 includes two planar surface 30 and 32 which form an acute angle of sharp edge 34. Barrel proximal end 26 has an aperture 40 sized with minimal clearance to receive threaded rod 42. A nut 50 may be threaded onto rod 42 to secure threaded rod 40 inside of barrel 22. Wedge 20 may be formed from steel, such as carbon steel, stainless steel, spring steel, or aluminum.

As shown in FIG. 3B, barrel 22 has a "D" shaped profile, and includes threaded apertures 52 and 53 that are perpendicular to the barrel length. Optionally, barrel 22 may have any number of common geometric shapes such as a square or a hexagon.

The following is a description of one method of attaching wedge 20 to ribs 16 and 17 may or may not include grooves 18 and 19. Wedge 20 is first configured to have a length that is less that the space where it is to be installed (less than the width WT) by threading threaded rod 42 into barrel 22. Wedge 20 is then placed in trough 14 with distal end 23 held in place against rib 16 or groove 18. Nut 50 is then advanced down threaded rod 42 towards aperture 40, causing wedge 20 to increase in length until tapered edge 48 (first end 21) contacts the opposing trough rib 17 and/or groove 19. The nut 50 is then further advanced on threaded rod 42 to a desired torque. Due to the torque, wedge 20 exerts a compressive force against trough ribs 16 and 17 at ends 48 and 34 respectively, maintaining the wedge in compression and with sufficient force to support loads perpendicular to the wedge.

FIGS. 5A and 5B are views of wedge 20 with an attachment, where FIG. 5A is a side elevational view and FIG. 5B is an end elevational view. Thus, threaded apertures 52 and 53 are adapted to accept, as attachments, a threaded rod 54, wire, cable or the like, and may be used for hanging loads from wedge 20, and which may be within trough 14 or which may extend below trough 14. Threaded rod 42 includes two planar surfaces 44 and 46, which to provide a sharp edge 48, which forms first end 21. A nut 56 may be used to lock and prevent rod 54 from loosening.

It is thus seen that in certain embodiments, all components of wedge 20 are in compression when installed within trough 14, with the wedge contacting ribs 16 and 17 of the trough. Wedge 20 may then support other elements, such as the attachment of FIGS. 5A and 5B. In an alternative embodiment, wedge 20 may include elements, such as an attached treaded rod, wire or the like, which extend outside of trough 14. Such elements are not, however, in compression.

Figure 6:
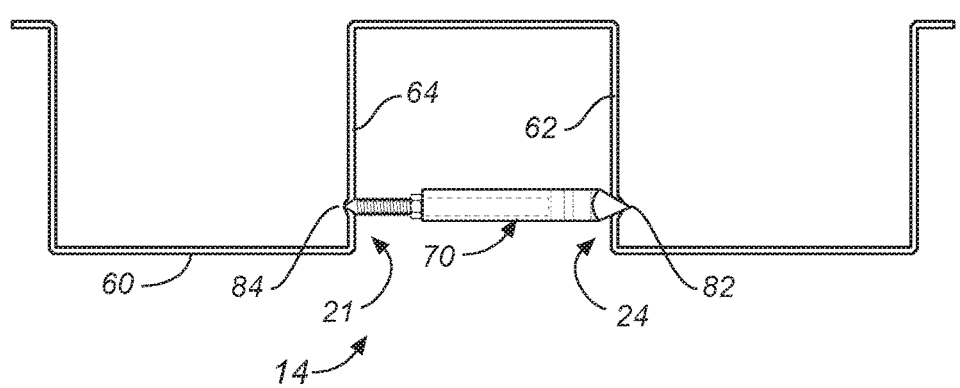
FIG. 6 is an elevational cross-sectional view of a second embodiment of a wedge as installed on a metal decking without concrete fill.

FIG. 6 is an elevational cross-sectional view of a second embodiment of a wedge 70 as installed on another prior art metal decking 60 without concrete fill. Wedge 70 is generally similar to wedge 20, except as explicitly noted.

Deck 60 includes trough ribs 62 and 64 that are vertical and parallel to each other, and does not include concrete. Trough 14 includes a pair of adjacent and opposing ribs 62 and 64 and the upper flute between the opposing ribs. Wedge 70 has an adjustable length between ends 21 and 24. As the distance between ends 21 and 24 is increased, end is forced against rib 64, resulting in a dimple or piercing 84 in metal decking 60, and end 24 is forced against rib 62, resulting in a dimple or piercing 82 in the metal decking. During installation, the compression force on wedge 70 increases until one or both ribs 62 and 64, at which time the compression force on the wedge decreases and may reach zero compression force if the walls are pierced. Optionally, wedge 70 may be installed into grooves (not shown) in ribs 62 and 64.

FIGS. 7A, 7B, 7C and 8 are several views of the second embodiment of wedge 70, where FIG. 7A is a side elevational view, FIG. 7B is an end elevational view, FIG. 7C is a top plan view, and FIG. 8 is an exploded side elevational view of the wedge, and FIG. 8 is an exploded side elevational view of the wedge of FIG. 6.

Wedge 70 includes a main barrel 72, which is generally similar to barrel 22, and includes a distal end 74 at barrel end 24 and which accepts a threaded rod 72, which is generally similar to threaded rod 42, and which extends to end 78 at barrel end 21. Ends 74 and 78 have pointed conical shapes.

Wedge 70 is installed on a metal decking in a manner similar to the installation of the previously discussed wedge embodiments. Thus, for example, the length of wedge 70 is expanded or lengthened to a prescribed torque force rating by rotating nut 50, which may allow the ends to slightly pierce the metal decking as shown at dimples or piercings 82 and 84.

FIGS. 9A and 9B are views of the wedge 70 of FIG. 6 with an attachment, where FIG. 9A is a side elevational view, and FIG. 9B is an end elevational view. The embodiment of FIGS. 9A and 9B is generally similar to that of FIGS. 5A and 5B.

FIG. 10 shows an alternate end 90 which may be provided at end 34, 74, or any of the other barrel ends embodiments described herein. End 90 includes four planar surfaces 94 that intersect at a point 96.

Figures 11A, 11B:
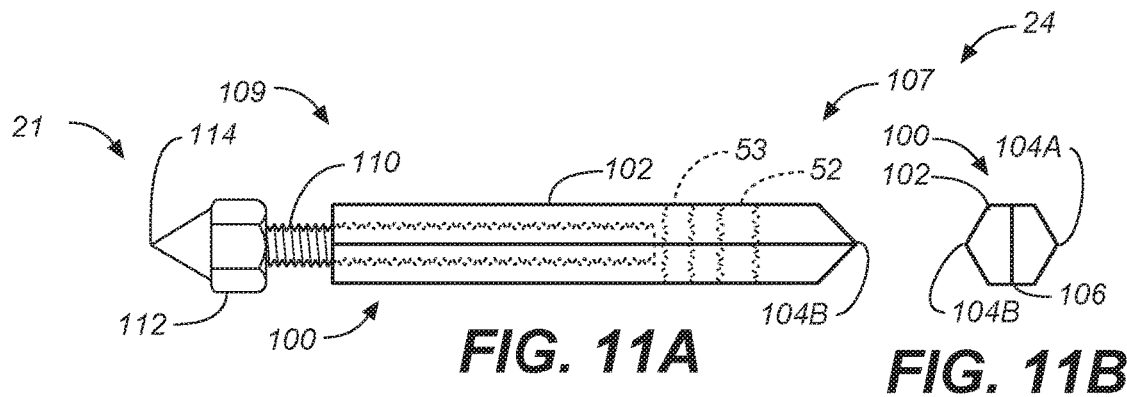
FIGS. 11A, 11B, and 11C are several views of the third embodiment of a wedge, where
Figure 11C:
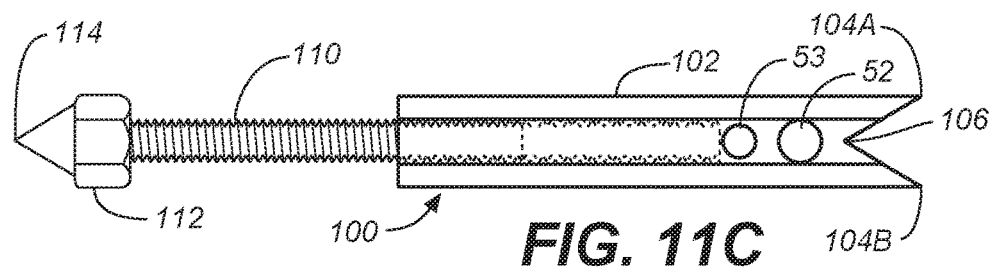
Figure 12:
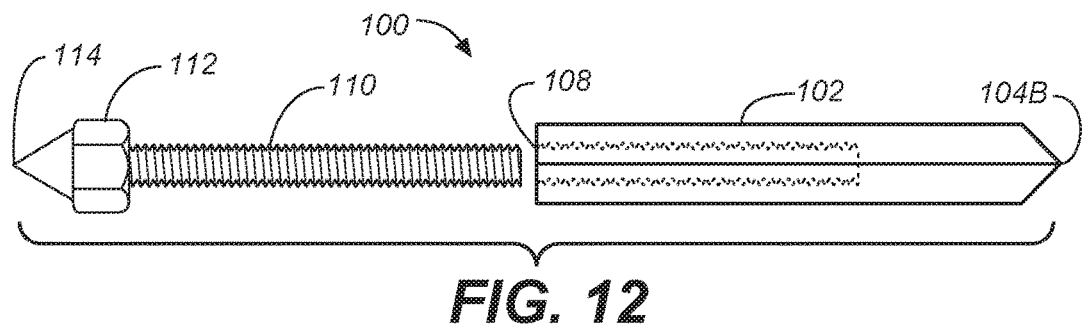
FIG. 12 is an exploded side elevational view of the wedge of FIG. 11A-11C.

FIGS. 11A-11C and 12 are views of the third embodiment of a wedge 100, where FIG. 11A is a side elevational view, FIG. 11B is a top plan view, FIG. 11C is an end elevational view, and FIG. 12 is an exploded side elevational view. Wedge 100 is generally similar to wedges 20 and 70 except as explicitly noted. Thus for example, wedge 100 has an adjustable length between ends 21 and 24.

The wedge 100 has a hexagon shaped barrel 102 with a distal end 107 and a proximal end 109. Distal end 107 includes a notch 106 which includes two tips 104A and 104B, and which forms end 24. Proximal end 109 includes an internally threaded bore 108 that is sized to accept a threaded bolt 110. Bolt 110 includes a hexagon head 112 with an integral cone 114, which forms end 21, and which is in alignment with the threaded shaft axis of the bolt 110. FIG. 11A illustrates wedge 100 in a minimum length configuration, ready for installation.

Wedge 100 may be installed by placing tips 104A and 104B against a metal surface, such as opposing surfaces of a metal decking, such as but not limited to deck 10 or 60. With tips 104A and 104B contacting the deck, rotation of wedge 100 about the axis between ends 21 and 24 is inhibited or resisted. Bolt 110 is then unthreaded from barrel 102, causing the wedge 100 to lengthen until the cone 114 contacts with the opposite wall of the corrugated metal deck trough. A torque wrench can then be applied to the bolt head 112 to a desired torque value, resulting in wedge 100 being securely attached to the metal decking. Next, a threaded rod, wire, cable or the like to be attached to wedge 100 at either threaded aperture 52 or 53. The hexagon shape of barrel 102 facilitates engagement with a wrench.

Figure 13:
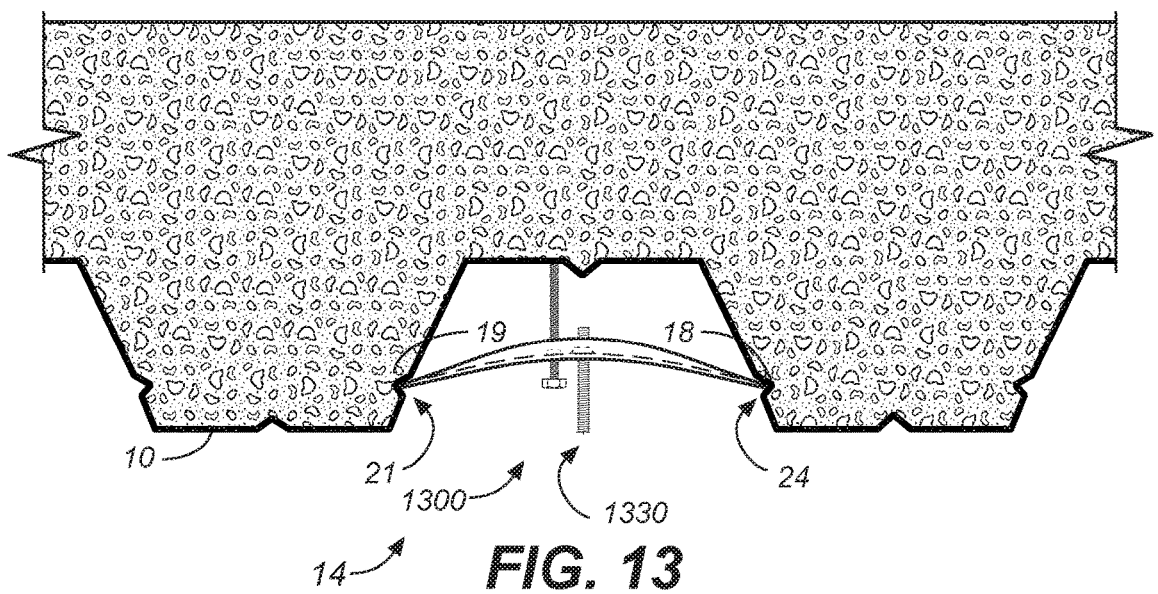
FIG. 13 is an elevational cross-sectional view of a fourth embodiment of a wedge as installed on a metal decking.

FIG. 13 is an elevational cross-sectional view of a fourth embodiment of a wedge 1300 as installed on a metal decking. Wedge 1300 is generally similar to wedges 20, 70, and 100, except as explicitly noted, and is intended for use in decks having grooves, as described above.

One difference between wedge 1300 and wedges 20, 70, and 100 is that wedge 1300 consists of an elongated body 1310 that is flexible between a first end 21 and a second end 24. There is no explicit mechanism for increasing the distance between ends 21 and 24 as, for example, is provided by threaded rod 42. Elongated body 1310 is instead designed to be flexible and capable of being snapped or forced between grooves 18 and 19

Thus, for example, certain embodiments of wedge 1300 may be installed in trough 14 as shown in FIG. 13, where elongated body 1310 must be slightly flexed to allow it to fit within grooves 18 and 19. FIG. 13 illustrates wedge 1300 as having an elongated body 1310 in compression from forces on first end 21 (which is inserted into groove 19) to a second end 24 (which is inserted into groove 18).

Figure 14A:
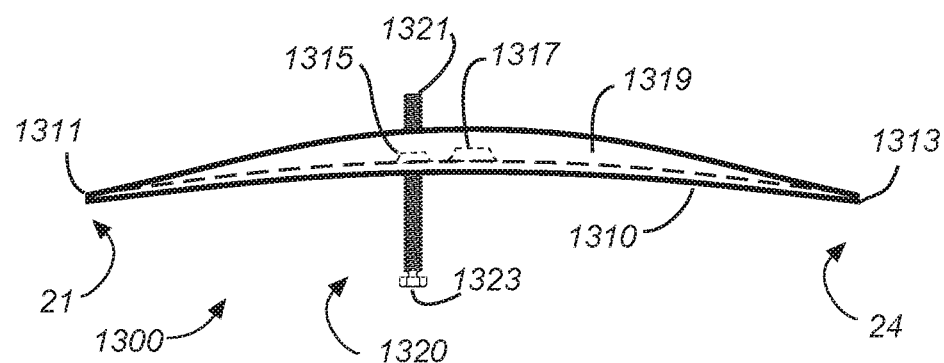
FIGS. 14A and 14B are several views of the wedge of FIG. 13, where
Figure 14B:
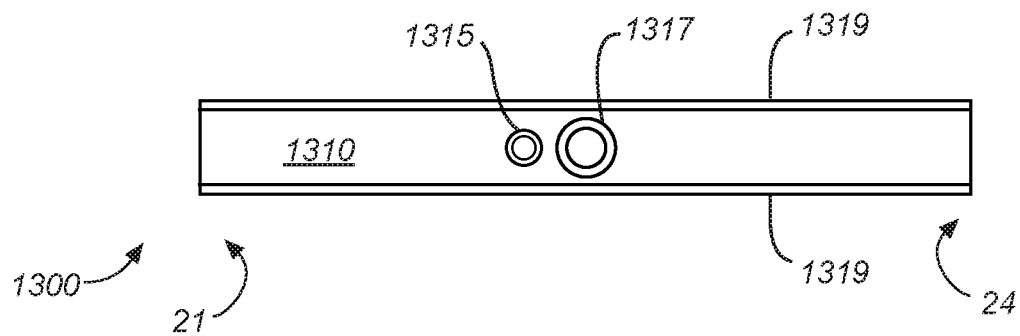

FIGS. 14A and 14B are several views of wedge 1300, where FIG. 14A is a side elevational view, and FIG. 14B is a top plan view. Wedge 1300 includes a curved metal piece 1310 that extends from an end 1311, which is wedge end 21, to an end 1313, which is wedge end 24. Wedge 1300 also includes sides 1319, which generally extend perpendicular to piece 1310, and a threaded hole 1315.

The distance between ends 1311 and 1313 is sized to fit in grooves 18 and 19. To install one embodiment of wedge 1300, the user places ends 1311/1313 in grooves 18/19 by pushing the wedge into metal decking. Piece 1310 and sides 1319 are formed from a thickness of spring steel. The act of pushing wedge 1300 into the metal decking causes piece 1310 and sides 1319 to flex and then relax as ends 1311/1313 fit into grooves 18/19. In certain embodiments, wedge 1300 so placed Wedge 1300 is thus slightly flexed and in tension against ribs 16 and 17. As a result, the wedge stays firmly held in place in compression as in certain other embodiments described herein. Threaded hole 1317 may be used to hang attachments, as described previously.

In one embodiment, curved metal piece 1310 is formed from spring steel, with an unflexed distance between ends 1311 and 1313 being slightly longer that the horizontal distance between grooves 18/19.

In one embodiment, wedge 1300 is thus installed merely by forcing the wedge ends into the grooves on the ribs of the metal decking. In another embodiment, wedge 1300 includes a threaded hole 1315 and a threaded rod 1320 which has a distal end 1321 and a proximal end 1323. Threaded rod 1320 include which includes a hex nut 1323 for tightening the rod through threaded hole 1315. To install this embodiment of wedge 1300, the user places ends 1311/1313 in grooves 18/19 by pushing the wedge into the deck, and or by turning the wedge perpendicular to the deck to cause the ends to fit into the groove. Next, nut 1323 is tightened. This causes distal end 1321 to push against deck 10 and, with sufficient torque on nut 1323, pushes the central part of piece 1310 away from the deck.

Since ends 1311/1313 are in grooves 18/19, the torque causes the ends 1311 and 1313 to move away from each other, which forces the wedge into the deck. As a result, the wedge stays firmly held in place in compression as in certain other embodiments described herein. In one embodiment, nut 1323 may include a torque-off hex head such that a proper torque is applied to wedge 1300. Thus, for example, nut 1323 may torque off of threaded rod 1320 at a torque of from 3 to 6 ft-lbs., or at a lower or higher torque. In one embodiment, threaded rod 1320 is a ¼ inch bolt, and is long enough to allow the distal end of the threaded rod to touch the upper flute of the metal decking when torqued.

Figure 15A:
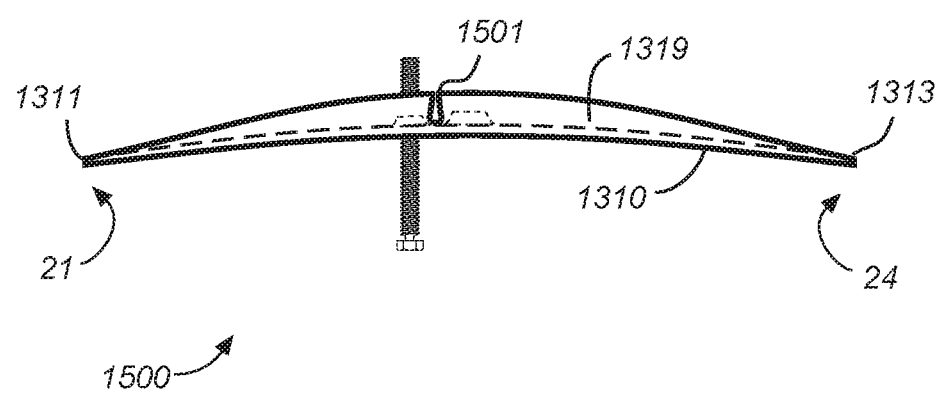
FIGS. 15A and 15B are several views of alternative embodiment of the wedge of FIG. 13, where
Figure 15B:
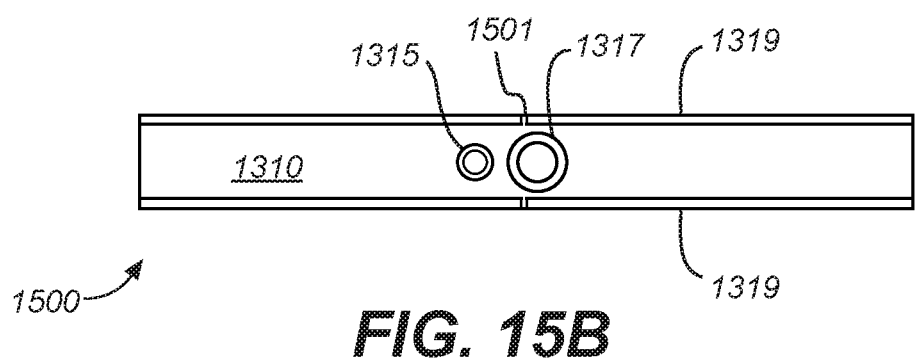

FIGS. 15A and 15B are several views of alternative embodiment of the wedge of FIG. 13, as wedge 1500, where FIG. 15A is a side elevational view, and FIG. 15B is a top plan view. Wedge 1500 is generally similar to wedge 1300, except as explicitly noted.

Wedge 1500 differs from the embodiments of wedge 1300 in that sides 1319 include a notch 1501. Notch 1501 to allow the arched piece 1310 to flex to fit between grooves 18/19, and to snap into place more easily.

Figure 16A:
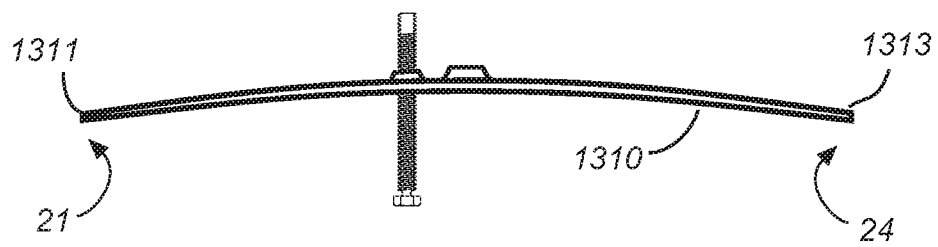
FIGS. 16A and 16B are several views of another alternative embodiment of the wedge of FIG. 13, where
Figure 16B:
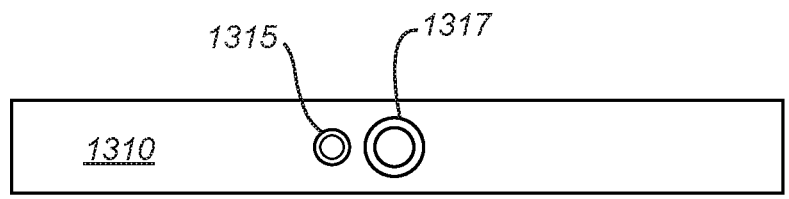

FIGS. 16A and 16B are several views of another alternative embodiment of the wedge of FIG. 13, as wedge 1600, where FIG. 16A is a side elevational view and FIG. 16B is a top plan view. Wedge 1500 is generally similar to wedge 1300, but is formed without sides 1319.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

I claim:

1. A method of attaching a hanger to the underside of a metal decking, where the hanger includes a flexible body having a fixed, unflexed distance between a first end and a second end, wherein the body includes a threaded hole generally perpendicular to an axis between the first and the second end and a threaded member engaging the threaded hole and having a proximal end near first upper flute and a distal end, where the metal decking has a depth extending between upper flutes and lower flutes, and ribs each connecting one upper flute to one lower flute, and where the metal decking includes at least one downwards facing trough including a first upper flute, and a first rib having a first groove generally parallel to the length of the metal decking and a second rib having a second groove generally parallel to the length of the metal decking, where the first rib and second rib are each attached to the first upper flute, where said first groove is facing said second groove, where the distance between the first groove and the second groove is a groove spacing, and wherein the fixed unflexed distance of the flexible body is at least equal to the groove spacing, said method comprising:

contacting the first end of the flexible body with the first groove of the first rib of the metal decking;

flexing the flexible body to decrease the fixed, unflexed distance between the first end and the second end to a distance equal to or less than the groove spacing;

contacting the second end of the flexible body with the second groove of the second rib of the metal decking, adjusting the threaded member such that the distal end contacts the first upper flute; and applying a torque to the proximal end, such that the flexible body flexes said first end and said second end, respectively, against the first groove and the second groove;

such that the flexible body is held in place between the first groove and the second groove.

2. The method of claim 1, further comprising supporting a load from the hanger.

3. The method of claim 1, where said contacting the second end of the flexible body with the second groove of the second rib of the metal decking includes:

pushing the body into the trough such that the first and second ends snap into the first groove and the second groove.

4. The method of claim 1, where the first rib and said second rib are parallel.

5. The method of claim 1, where the spacing between a first edge and a second edge of the upper flute is less than the spacing between said first rib and said second rib near said lower flute.

6. The method of claim 1, wherein the flexible body between the first end and the second end is a unitary body.

\* \* \* \* \*